(12) United States Patent
Vice

(10) Patent No.: US 7,819,145 B1
(45) Date of Patent: Oct. 26, 2010

(54) DADO GUIDE

(76) Inventor: James Perry Vice, 288 Boeing Ct., Livermore, CA (US) 94551

( * ) Notice: Subject to any disclaimer, the term of this patent is extended or adjusted under 35 U.S.C. 154(b) by 695 days.

(21) Appl. No.: 11/729,184

(22) Filed: Mar. 27, 2007

(51) Int. Cl.
*B27C 5/00* (2006.01)
(52) U.S. Cl. ................................ 144/144.1; 144/145.1
(58) Field of Classification Search ............. 144/144.1, 144/144.51, 145.1; 409/125, 130; 83/827–829
See application file for complete search history.

(56) References Cited

U.S. PATENT DOCUMENTS 5,299,609 A * 4/1994 Wedler ...................... 144/48.6
5,738,470 A * 4/1998 Sugita ........................ 409/178
5,758,998 A * 6/1998 White ........................ 409/180

* cited by examiner

*Primary Examiner*—Shelley Self
(74) *Attorney, Agent, or Firm*—Risto A. Rinne, Jr.

(57) ABSTRACT

An apparatus for cutting dado cuts in a board includes a first base member that includes an adjustment for surrounding a fence. A pair of rods extend away from the first base member and are attached to a first rail. A second base member includes a pair of spaced apart holes through which each of the pair of rods passes. A locking lever is used to secure the second base member in position relative to the pair of rods. The second base member is mounted over the rods in either of two ways. Each side of the second base member provides an indication as to where and edge of the dado cut will occur in a board. The width of the dado cut is readily adjustable by urging the second member into the desired position and by actuating the locking lever.

9 Claims, 4 Drawing Sheets

DADO GUIDE

This application is related to co-pending patent application Ser. No. 10/895,753, entitled "Dado Guide", by the same inventor that was filed on Jul. 20, 2004.

BACKGROUND OF THE INVENTION

1. Field of the Invention

The present invention, in general relates to woodworking tools and, more particularly, to a guide for use along with a router in the cutting of a dado.

Routers are used to make dado cuts, which are essentially channels, in boards for shelves and other similar purposes. The finished dado cut is also sometimes referred to as merely a "dado". It is important to make the dado cut precisely where desired to prevent damage to the board and also to ensure that all parts align, for example, that both sides of a shelf are parallel. This requires precise location of each dado cut on each side of the shelf.

Prior types of devices used to help make a dado cut with a router are generally referred to as "dado guides". However, prior types of dado guides have certain disadvantages. For example, one such type of product that is available from Accurate Woodworking Tools, LLC, 6991 Hollander Lane, Pickett, Wis., 54964, is referred to as their model "ACCU-RATE GUIDE".

It relies on a fixture (i.e., the guide portion) that slides along adjacent to a fence. The fence is clamped onto a board to be cut (also sometimes referred to as a "work-piece") and the fixture is attached to a router by rods that extend away from the fixture. Accordingly, the router is disposed the width of the fixture plus the length of the rods away from the fence.

Two cuts are generally required for each dado cut that is made on each board. This is because the width of the dado-cut usually exceeds the width of the router bit that is making the cut. Therefore, multiple passes of the router and router bit are required in order to make the dado cut. The first pass is made with the fixture adjacent to the fence. Subsequent passes will require that the router be offset further away from the fence.

The first pass is itself, difficult because there is often no mechanism that ensures the fixture will stay adjacent to the fence. Accordingly, the fixture can pull away from the fence if the user is not careful. One moment of inattentiveness and the board is ruined.

However, there is another substantial disadvantage that occurs when the router is disposed a substantial distance away from the fence. This disadvantage remains true for the first and also for the second or all subsequent passes.

The distance that the router is disposed away from the fence produces a moment arm when pushing on the router longitudinally with respect to the fence. Accordingly, torque is produced that attempts to twist (i.e. rotate) the fixture relative to the fence (i.e., the router experiences a force that is urging it to rotate about the moment arm and to move in closer toward the fence). Absent a mechanism to hold the fixture in position proximate the fence, the fixture can rotate, thereby skewing the cut that is being made and again ruining the board.

It is especially important to understand that this phenomenon of torque, while related to the distance the router is disposed away from the fence, has a critical limit. If the router is held so that its center is within a few inches of the edge of the fence, almost all of the force that is applied to urge the router and dado guide longitudinally along the length of the fence is used for that purpose. Very little torque is produced and very little binding occurs.

However, when the router is disposed a few more inches away from the fence, considerable torque and binding can occur. Therefore, it is not necessary—nor is it even possible—to dispose the router directly over the fence. It is a substantial improvement over the known prior art to dispose the router sufficiently close to the fence so as to minimize the moment arm below a critical point that produces noticeable binding.

If the prior art dado guide fixture is of a type that is adapted to engage with a fence (i.e., to surround a portion of the fence on both sides), then the torque that is produced tends to bind the fixture relative to the fence, making it especially difficult to urge the router along the longitudinal length of the fence.

The greater the distance the router is disposed away from the fence, the greater will be the moment arm that is produced and, accordingly, the greater will be the torque (i.e., the moment arm) that is generated and, therefore, the greater will be the binding of the fixture to the fence. As greater force is applied to the router to urge it along the longitudinal length of the fence, the greater is the likelihood that slippage can occur, thereby damaging the work-piece or possibly even exposing the user to possible injury. Also, the more force that is applied to a prior art type of router or dado guide fixture, the greater in turn will be the binding that results, due to the long moment arm.

Another disadvantage with prior art fixtures (i.e., various types of dado guides) is that the attachment of the router to the fixture produces a relative, changing, and unpredictable distance between the two. It depends on how deep the rods are attached to the fixture and how deep the rods are inserted into the base of the router itself. There is no fixed or minimum distance from the router bit to any portion of the fixture. Accordingly, there is no way to determine exactly where the dado cut will actually occur in the board (work-piece). Careful measurement is required which, at best, provides a guess as to where the dado cut will occur.

A further disadvantage of the prior art devices is that after the first cut necessary to make the dado cut has been made, then a piece of scrap wood from the shelf or board that will eventually be placed into the dado cut must be inserted into the fixture to introduce a further offset in the position of the router and router bit relative to the fence sufficient to displace the router bit further away from the fence an amount that is equal to the thickness of the board that will be inserted into the dado cut.

There are numerous disadvantages with this approach, let alone the most obvious disadvantage that there may simply not be a scrap piece of wood available if the entire length of the board that is placed in the dado cut is to be used. For example, a person can purchase several three foot long shelves, already cut, and plan on using them to make a bookcase. There are no scrap pieces available in this instance. If a portion of one of the shelves is used, then that entire shelf may become scrap, thereby increasing cost and waste.

Assuming that scrap material is available and that the prior art type of fixture can be set for the second pass (i.e., the second cut necessary to complete the dado cut), the cutting operation must then be interrupted (i.e., stopped) in the middle of each dado cut that is being formed and the fixture adjusted prior to finishing the dado. This is especially time consuming to accomplish for each dado cut that is to be made. Remembering that if four or five shelves are to be used then eight to ten dado cuts will be required, each of which will require this stoppage and additional calibration step to occur before completion of that particular dado cut can occur.

It is also useful to note that sometimes two passes (i.e., cuts) may not be enough to fully form the dado cut if an especially wide shelf is being used or if the router bit is especially tiny. It is desirable for the dado guide fixture to define both the inside pass (i.e., an inside edge of the dado cut) and the outside pass (i.e., an outside edge of the dado cut).

Then, with a prior art type of device, the user can make additional passes as needed to carefully remove the inner remaining material from the dado cut. However, unless the dado guide is able to limit the range of motion that the router can experience that is either closer to or further away from the fence, the danger is that the user may slip and move the router either too close or too far away from the fence, thereby damaging or ruining the work-piece (i.e., the shelf).

Or, with certain other prior art device, the operation must again be stopped during each dado cut and the fixture reset so that a third setting can be made to remove some of the remaining material from the dado cut. Again, if the shelf is especially wide or if the router bit is small, several such stoppages and additional settings may be required to fully remove all of the material from each dado cut.

Second, the scrap wood must be inserted into a particular slot of certain prior art devices depending upon the size of the router bit and the thickness of the dado cut. If the scrap wood is inserted in the wrong slot, which is entirely possible, then too large a dado can be produced, thereby ruining the entire board (work-piece).

Since the board that is having the dado cuts made therein is usually a side of a bookcase or other large piece of furniture, it tends to be the most expensive part of the bookcase or other type of furniture. This is often true because the board tends to be large and also because an entire exterior of it is often visible. Therefore, a high grade of material is often used. This makes it especially exasperating to damage the work-piece. Also, if several dado cuts are being made in the board, it is indeed quite exasperating for a fixture-related problem to ruin the work-piece while making one of the last of the required dado cuts.

Third, after this adjustment has been made with the prior art device, and a second pass (cut) is to be made, the router is thereby displaced in such a manner as to include an offset with respect to that portion of the dado cut that has already been made in the board. If the dado extends from end to end of the board, then the next pass (i.e., cut) can be made from beyond one end of the board extending past the other end and using the same router bit.

However, certain types of dado cuts do not extend from end to end of the board, Rather, they are contained within the board (i.e., they do not extend to the ends of the board). This type of a dado cut is sometimes referred to as a "stop dado" or "stop dado cut" because it extends across the board for an amount and then stops before an end or both ends of the board are reached.

When making a stop dado cut, after having made a first pass and after having reset the fixture so as to displace the router and router bit further away from the fence, the new cutting position of the router bit will interfere with the wood. It will not be possible to place the router fully down into the fixture without having to remove some of the remaining wood from the dado cut. In order to accomplish this, a further changing of router bits (to a new bit that can cut on its bottom) in order to penetrate the wood will likely be required. The wood will then need to be penetrated with the "end cutting" type of router bit from the top down in order to expand the size of the dado cut sufficient to accommodate the router bit and allow placement of the router fully down again into the fixture. After the "plunge cut" into the board has been made it is likely that a changing back to the original router bit (that cuts on its circumference, but not its bottom) will be required to finish the stop-dado type of cut. These router bit changes greatly extends time to complete each stop dado cut.

Clearly, it is desirable to provide a dado guide that will allow any number of subsequent passes to occur when making stop dado cuts that can all be accomplished with the same, side or circumferential-type of router bit, thereby eliminating the need for additional plunge-cuts.

There is another problem associated with the use of routers making two (or more) passes to form a dado cut. The first pass is typically made in a first direction and the second pass is typically made in an opposite second direction. In one direction the router bit itself is rotating in a direction that tends to pull the router toward the fence and in the opposite direction, the router bit will tend to urge the router away from the fence. Motion in either direction can ruin the board that is being cut. This is difficult, especially for unskilled users, in that sufficient skill and anticipation of the router-created forces have not yet been well-developed.

Additionally, certain prior art devices may include detachable parts, like pins, that can easily be lost or misplaced. It is desirable to provide a dado guide that does not include small detachable parts.

Additionally, it is also desirable to be able to set the desired width of a dado cut as quickly as possible. Prior art devices that use replacement shims or templates or which rely on the loosening of a locking type of screw are time-consuming and difficult to set. Such devices require moving a part after the screw has been loosened, and then tightening the screw to secure the adjustable part in the desired new position or with the new shim or template in position. There is also the possibility that the part that has been moved can shift position before the screw is once again fully tightened, thereby resulting in a dado cut that is either too wide or too narrow.

Accordingly, there is a need to be able to quickly set the width of a dado cut.

There is also a need to readily and precisely determine an edge of the dado cut. If a dado cut is not made at a precise location, then the shelves that extend across the two boards will not be level. This too can potentially ruin one or both of the work-pieces.

Similarly, there is a need for a dado guide that can be quickly set to accommodate different sizes of fences. Different users have different fences. There is not a uniform universal standard for the size of fences. Therefore, an ideal dado guide would permit adjustment sufficient to accommodate a variety of different sizes of fences.

Also, as mentioned above, sometimes a dado-cut will not pass entirely across the board thereby requiring that a "stop-dado" or "stop-dado cut" be made. It is difficult with prior art devices to determine where to stop longitudinal movement of the dado guide (and router) along the fence in order to end the stop dado cut exactly where the "stop" is required to occur. Accordingly, there exists a need to readily determine a stop position for a dado cut.

Also, there are a couple of sizes of router bits that are most commonly used to form a dado cut. This is simply a matter of mechanical engineering in that the width of most boards (i.e., shelves) will be greater than about three-eighths of an inch in order to provide sufficient load-bearing capability. This is true whether the shelf is made of wood or some other material, such as glass.

Accordingly, the two most common router bit sizes for use in forming dado cuts are three-eighths of an inch in diameter and one-half of an inch in diameter. It would also be especially desirable for a router guide to accept these two sizes of router bits with minimum adjustment and, after such minimum adjustment had been accomplished, to provide clear indication as to where an edge of the resultant dado cut that is to be made will occur.

It is important to note that all shelves are not made of wood. If a glass shelf is to be inserted into the dado cut, that further compounds the problems mentioned hereinabove that appertain to the known prior art devices. For example, it is not practical to provide a scrap piece of the glass shelf for calibration of the width of the dado cut that is required. Neither is it possible to hold a large piece of glass in a prior art type of dado guide during the actual formation of the dado cut.

Accordingly, there exists today a need for a dado guide that helps ameliorate these and other disadvantages.

Clearly, such an apparatus would be a useful and desirable device.

2. Description of Prior Art

Dado guides are, in general, known and are similar to the above-described device available from Accurate Woodworking Tools, LLC. In general, the router is displaced away from a fence and produces substantial torque when pushed. The cutting procedure for each dado must be interrupted (i.e., it cannot be a continuous operation). Scrap boards are required to adjust the cutting width. And a lack of precision in setup as well as location of the actual dado is inherent with all known prior art devices.

While the structural arrangements of the above described devices, at first appearance, may have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a dado guide that is easy to use.

It is also an important object of the invention to provide a dado guide that disposes a router a known, predetermined distance away from a fence.

Another object of the invention is to provide a dado guide that disposes a router a minimum distance away from a fence.

Still another object of the invention is to provide a dado guide that allows adjustment of the thickness of the dado without the need for a scrap piece of wood or other material that must be included with the guide during use.

Still yet another object of the invention is to provide a dado guide that allows for adjustment of the thickness of the dado cut depending upon the size of the router bit.

Yet another important object of the invention is to provide a dado guide that includes a first assembly and a second assembly, and wherein the second assembly is adapted to be disposed with respect to the first assembly in either of two positions, and wherein each of the two positions are adapted to work with a particular diameter of router bit.

Still yet another important object of the invention is to provide a dado guide that allows for a dado to be cut in two passes in one continuous motion.

A first continuing object of the invention is to provide a dado guide that includes an inside bottom edge of a second base member that precisely indicate where an edge of the dado cut will be occur.

A second continuing object of the invention is to provide a dado guide that includes a pair of inside bottom edges in of a second base member that precisely indicate where an edge of the dado cut will occur for two different sizes of dado bits, respectively.

A third continuing object of the invention is to provide a dado guide that includes an adjustment that is suitable for use with a variety of fences, including various manufactured fences.

A fourth continuing object of the invention is to provide a dado guide that minimizes torque when the router is pushed.

A fifth continuing object of the invention is to provide a dado guide that includes friction reducing material intermediate the guide and a fence.

A sixth continuing object of the invention is to provide a dado guide that permits errors during cutting a dado that do not damage the board being cut.

A seventh continuing object of the invention is to provide a dado guide that permits errors to occur during a dado cut that will not damage the board being cut because all extraneous motion of the router bit that can occur wherein the router bit is urged either closer to a fence or further away from the fence is limited so as not to exceed a desired width of the dado cut that is being made.

An eighth continuing object of the invention is to provide a dado guide that does not include detachable pins.

A ninth continuing object of the invention is to provide a dado guide that is adapted for use with a router guide bushing, a router bit passing through the router guide bushing and wherein a center opening of variable size in a first direction is provided in the dado guide to accept the router guide bushing and allow motion of the guide bushing therein along the first direction, and wherein the first direction is disposed perpendicular to a longitudinal axis of a fence thereby permitting movement of the guide bushing relative to the dado guide to occur either closer toward the fence or further away from the fence, and wherein the center opening does not allow motion of the guide bushing relative to the dado guide in a second direction that is parallel with the longitudinal axis of the fence.

A tenth continuing object of the invention is to provide a dado guide that is adapted for use with a variety of different fences that include different sizes.

An eleventh continuing object of the invention is to provide a dado guide that can be set to accommodate a desired width of a fence.

A twelfth continuing object of the invention is to provide a dado guide that includes a cam locking mechanism to set the width of the dado cut.

A thirteenth continuing object of the invention is to provide a dado guide that can be easily and inexpensively manufactured.

A fourteenth continuing object of the invention is to provide a dado guide that requires a minimum amount of machining to manufacture.

A fifteenth continuing object of the invention is to provide a dado guide that provides an easy and clear indication of where an edge of a dado cut is to be made on a board.

A sixteenth continuing object of the invention is to provide a dado guide that provides an easy, clear, and precise indication of where a stop dado cut is to begin or end.

A sixteenth continuing object of the invention is to provide a dado guide that does not require a plunge cut down into a board in order to complete a second pass when making a stop dado cut.

Briefly, a dado guide that is constructed in accordance with the principles of the present invention has a first assembly that includes an adjustment for surrounding a fence sufficient to retain the dado guide in a fixed position with respect to the fence and allow for the dado guide to move along the longitudinal length of the fence. Each of a pair of rods extends away from a first base member of the first assembly. Each of the rods is attached at one end thereof to a first rail. A planar top plate is attached to a top of the first base member and extends over and beyond the first rail. A lip that is disposed at a ninety-degree angle with respect to a remainder of the top plate is provided at a distal end of the top plate. The lip is disposed adjacent to one longitudinal side of the fence during use. The pair of rods are urged longitudinally through the first base member and are used to dispose an edge of the first rail adjacent to the fence on a side opposite of the fence that an inside edge of the lip is in contact with. The distance that the edge of the first rail is disposed away from the inside edge of the lip is set to be equal to the width of the fence. A pair of set screws each pass through one of a pair of threaded holes in a first base member and secure the pair of rods, and therefore, the first rail in the desired position with respect to the lip. During use, the edge of the first rail and the inside edge of the lip are disposed adjacent to and on opposite sides of the fence. A portion of the top plate overlaps a portion of a top of the fence. A second assembly includes a second base member. A pair of spaced-apart holes are provided through the second base member. The pair of rods pass through the pair of spaced-apart holes and also through a locking lever that is disposed in a first recess provided in the second base member. The locking lever is used to secure the second assembly in position relative to the pair of rods and therefore, relative to the first assembly. This is used to determine a width of a dado cut that is made in a board, which is also sometimes referred to as a work-piece. Each distal side (plane) of the second base member provides an indication as to where the dado cut is to occur in the board. The width of the dado cut is set by placing a thickness of a shelf that is intended to fit inside of the dado cut on top of the pair of rods that are disposed between the first base member and the second base member. The second assembly can be disposed in either of two operating positions relative to the first assembly, depending on the size of a router bit that is being used to cut the dado. The second assembly is then urged along the longitudinal length of the pair of rods and toward the first assembly until a top first edge of the first base member and a top second edge of the second base member are disposed snugly against opposite surfaces of the shelf. At that time, the locking lever is set to retain the second assembly in position relative to the first assembly. At that time, the dado guide is set to create the dado cut so that its width is equal to the thickness of the shelf. The depth of the router bit is set to control the depth of the dado cut. The dado guide is placed on the fence. A first mark is provided in the board where an edge of the dado cut is desired. An inside bottom edge of the second base member is set to align with the first mark. The fence is clamped to the board. If the length of the dado cut does not reach an edge of the board a stop dado cut mark is provided. A router is placed in a guide bushing. The router and attached router bit along with the guide bushing are placed in a center opening that is provided in the dado guide. The center opening is disposed between the pair of rods, which are set apart from each other so as to equal a diameter of the guide bushing. A second recess is provided in the first base member between the pair of rods and an opposite third recess is provided in the second base member on a first side thereof between the pair of rods and a fourth recess that is between the pair of rods is provided in the second base member on a side that is opposite the first side thereof. The guide bushing, and therefore the router bit, can move along the center opening parallel with the pair of rods. This range of motion determines the width of the dado cut. The guide bushing is secured by the pair of rods so that it cannot move perpendicular to the longitudinal axis of the pair of rods. A longitudinal axis of either of the pair of rods is perpendicular with respect to a longitudinal axis of the fence. Accordingly, as the dado guide is urged along the longitudinal length of the fence, the router, guide bushing, and router bit are moved along the longitudinal length of the fence. This process is repeated, with the router being held adjacent to the first base member for a first pass and then maximally away from the second base member as the length of the center opening allows for a second pass to complete the dado cut. For very wide dado cuts, it may be necessary to make a third pass with the router disposed midway between the first base member and the second base member.

DETAILED DESCRIPTION OF THE INVENTION

Figure 1:
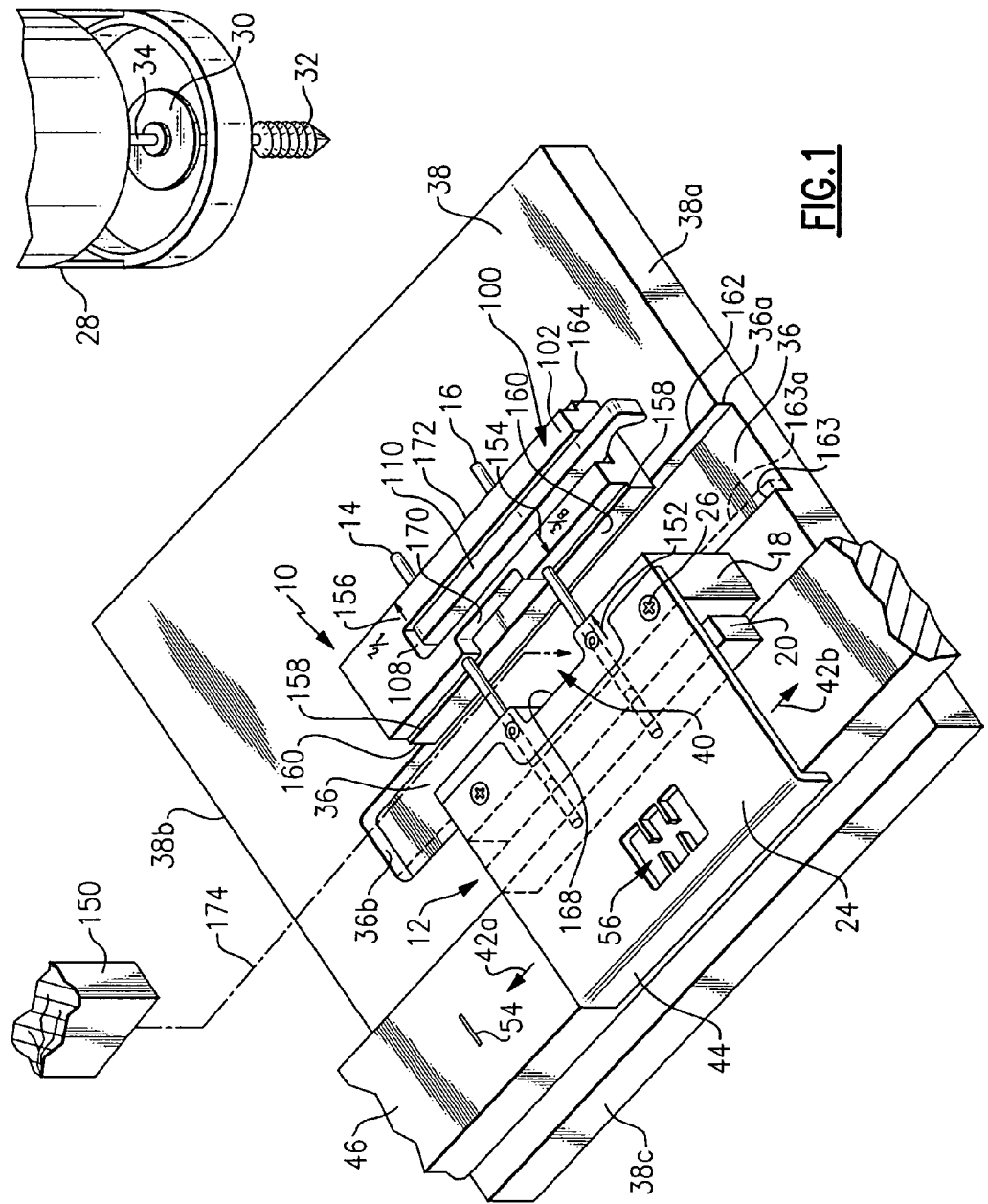
FIG. 1 is a view in perspective of the dado guide disposed over a board with a dado cut therein and also over a fence.

Referring to all of the drawings on occasion and now in particular to FIG. 1 is shown, a dado guide, identified in general by the reference numeral 10. It is preferable to also often refer to FIG. 2.

The dado guide 10 includes a first assembly identified in general by the reference numeral 12. The first assembly 12 includes a pair of rods 14, 16 that pass completely through a first base member 18.

A first end of each of the pair of rods 14, 16 is attached to a first rail 20 on a first side 18a of the first base member 18. The first rail 20 is adapted to move closer toward the first base member 18 or further away from the first base member 18 as shown by arrow 22.

A planar top plate 24 is attached to a top of the first base member 18 by a pair of screws 26. The screws 26 are counter sunk sufficient so that a top of each of the screws 26 is parallel with a top of the planar top plate 24.

During use, a router 28 (partially shown in FIG. 1) is secured to a router guide bushing 30. The router guide bushing 30 includes a predetermined size that is typically about an inch in diameter. The dado guide 10 is designed for use with a predetermined diameter of the guide bushing 30.

A router bit 32 is attached to an end of a router drive shaft 34, the drive shaft 34 being rotated by the router 28. During use, the depth of the router bit 32 below a bottom of the guide bushing 30 is set to determine the depth of a dado cut 36 that is to be formed in a board 38. The board 38 is also sometimes referred to as a "work-piece" in the woodworking arts.

It is important to note that in the example as shown in FIG. 1, a first end 36a of the dado cut 36 extends fully to a first end 38a of the board 38 while a second end 36b of the dado cut 36 stops in the middle of the board 38 and therefore does not extend to an opposite second (stop dado) end 36b of the board 36. The second end 36b of the dado cut 36 is known either as a "stop dado" or as a "stop dado cut" because it does not extend fully to a second end 38b of the board 38.

It is, of course, possible to include a second stop dado (not shown) in the board 38 so that no portion of the dado cut 36 extends to either the first end 38a or to the second end 38b of the board 38.

During use, the router 28 is disposed on top of the dado guide 10 with the guide bushing 30 being disposed in a center opening, identified in general by the reference numeral 40. The router bit 32 extends downward into the board 38 an amount equal to the depth of the dado cut 36.

Figure 2:
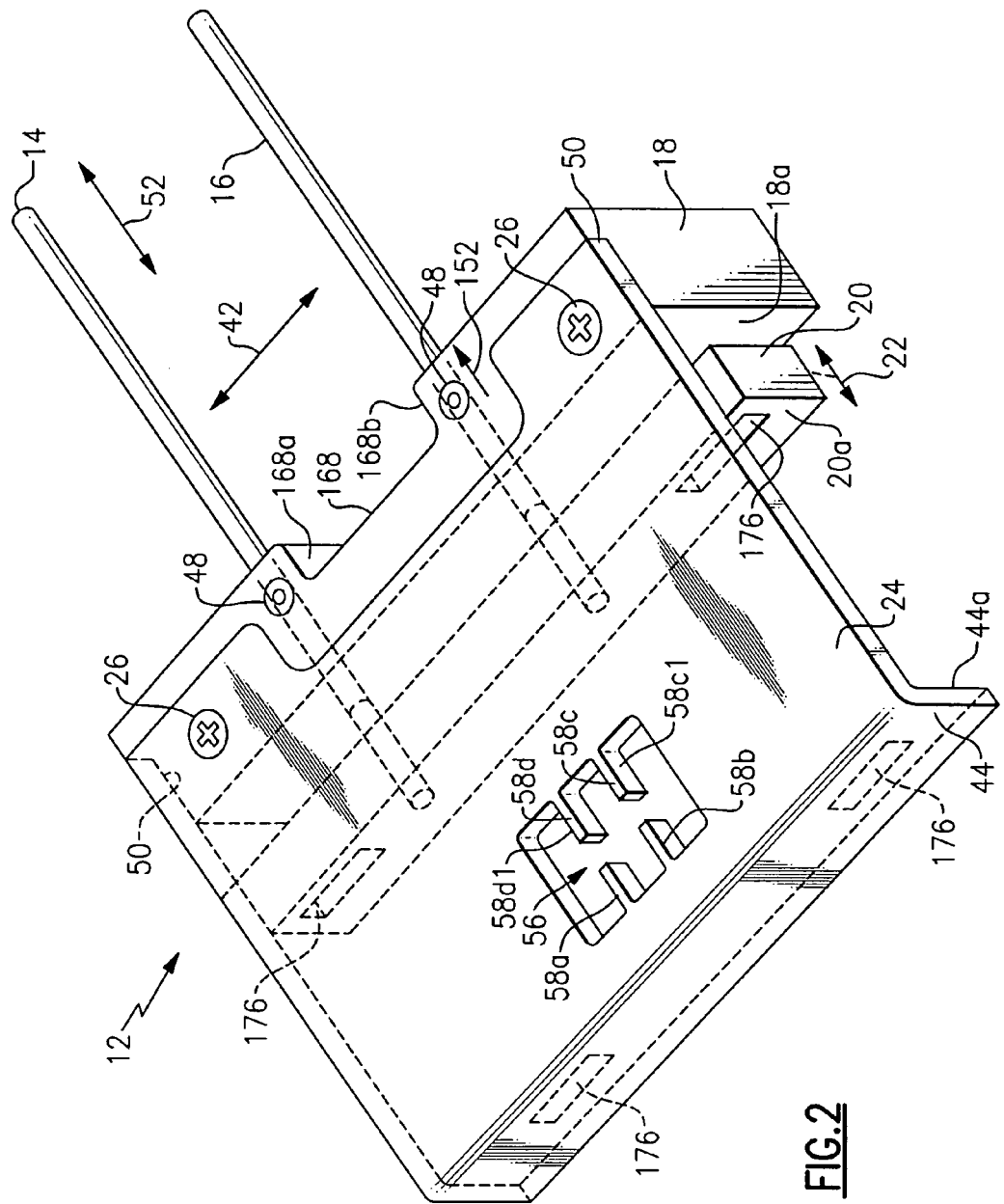
FIG. 2 is an enlarged view in perspective of a first assembly of the dado guide of FIG. 1.

The center opening 40 is disposed between the pair of rods 14, 16 which are spaced-apart from each other an amount sufficient to receive the diameter of the guide bushing 30 therein and to prevent motion of the guide bushing 30 relative to the dado guide 10 in a direction as shown by arrow 42 (FIG. 2).

If the router 28 is urged by a user (not shown) in either (opposite) direction of arrow 42, the force is conveyed to one of the rods 14, 16 respectively which, in turn, urges the dado guide 10 in the direction of the applied force upon the router 28.

The planar top plate 24 extends over and beyond the first rail 20 away from the first base member 18. A lip 44 is attached to an end of the planar top plate 24 that is disposed away from the first base member 18. The lip 44 is disposed at a ninety-degree angle with respect to a remainder of the top plate 24.

The lip 44 does not extend down as far as does the first base member 18. During use, a bottom surface of the first base member 18 is in contact with an upper surface of the board 38. The bottom surface of the first base member 18 helps define a bottom plane of the dado guide 10 with respect to the board 38.

Accordingly, because the lip 44 does not extend down as far as does the first base member 18, the lip 44 will not contact the upper surface of the board 38. This prevents marring of the board 38 by the lip 44.

During use, a fence 46 is clamped or otherwise secured relative to the board 38. Spacing between the lip 44 and the first rail 20 is set prior to use to accommodate a width of the fence 46.

A pair of set screws 48 pass through respective threaded holes that are provided in the first base member 18 and are used to secure the pair of rods 14, 16 relative to the first base member 18. To adjust the dado guide 10 for various sizes of the fence 46, as may be encountered, the pair of set screws 48 are loosened and the first rail 20 urged sufficiently far toward the first base member 18 so that the fence 46 can be placed between the first rail 20 and the lip 44 with a portion of the top plate 24 extending over and across the fence 46.

The first rail 20 is then urged toward the lip 44 an amount sufficient to remove slack between the first rail 20 and the fence 46 and between the lip 44 and the fence 46. The pair of set screws 48 are then tightened to secure the first rail 20 relative to the lip 44 and also to secure the first rail 20 relative to the first base member 18.

The dado guide 10 is then set for continued use with that particular fence 46. After initial adjustment for the fence 46 has been accomplished it is not required to again adjust the dado guide 10 in this manner unless a different width of fence (not shown) is to be used.

A top of each of the pair of set screws 48 does not extend above a top surface of the first base member 18. The first base member 18 is machined at the top surface thereof to remove some material from the top surface to correspond with a shape and depth of the top plate 24 and provide a base member upper recess 50 (FIG. 2) that is as deep as the top plate 24 is thick.

Accordingly, a top plane (i.e., surface) of the top plate 24 is level with the top surface of the first base member 18. During use (i.e., when actually making the dado cut 36) a base (i.e., a bottom) of the router 28 is disposed on the top plane of the top plate 24 and on the top surface of the first base member 18.

To ensure that a bottom plane of the router 28 corresponds with the top surface of the first base member 18 and the top plane of the top plate 24, neither the screws 26 nor the set screws 48 are allowed to protrude.

The lip 44 is disposed adjacent to a side of the fence 46 during use. During use, an edge 20a of the first rail 20 and an inside edge 44a of the lip 44 are disposed adjacent to and on opposite sides of the fence 46. Arrow 42 is parallel with a longitudinal axis of the fence 46. Arrow 52 (FIG. 2) is perpendicular with respect to arrow 42 and therefore with respect to the longitudinal axis of the fence 46. Both arrows 42, 52 are parallel with the surface (plane) of the board 38.

The dado cut 36 is accomplished, in part, by urging the router 28, the guide bushing 30, the router bit 32 and the dado guide 10 in either direction of arrow 42. To accomplish the width of the dado cut 36 an additional adjustment is required and is described in greater detail hereinafter. All necessary adjustments including the additional adjustment are made to the dado guide 10 before any portion of the dado cut 36 is attempted. However, it is useful to understand at least in part how the dado cut 36 is made into the board 38 at this time.

If the dado cut 36 is to include one or more of the dado stops 36b it is important for the user to know when and where he or she must stop motion of the router 28 along arrow 42 so as to terminate the dado cut 36 in the board 38 where desired. A stop dado cut mark 54 is provided on the fence 46 in the middle thereof before attempting the dado cut 36. The stop dado cut mark 54 is indicative of where the dado cut 36 is to stop and thereby form the stop dado 36b.

Arrow 42a is shown in FIG. 1 to indicate an upper direction of arrow 42. Arrow 42b is shown in FIG. 1 to indicate an opposite lower direction of arrow 42. These are the only two possible directions that the dado guide 10 can be urged relative to the fence 46.

When the dado guide 10 and router 28 are being urged in the direction of arrow 42a, the location of the stop dado cut mark 54 becomes important to the formation of the stop dado cut 36b.

The top of the planar top plate 24 includes a top plate opening 56 with a plurality of protrusions 58a-58d that extend from the sides of the top plate opening 24 into the center thereof. Each of the protrusions 58a-58d includes a pair of edges that are parallel with arrow 52.

Protrusions 58d and 58c are used when a one-half inch diameter router bit 32 is used. When the one-half inch router bit 32 is used (for example) and an outer edge 58d1 aligns with the stop dado cut mark 54, the user stops urging the router 28 and the dado guide 10 in the direction of arrow 42a because an end of the stop dado 36b is precisely where it is desired.

Conversely, if direction of the cut were to occur in the direction of arrow 42b and a second stop dado cut mark (not shown) was included on the fence 46, the user would stop moving the router 28 in the direction of arrow 42b when a second outer edge 58c1 aligned with the second stop dado cut mark.

Protrusions 58a and 58b are similarly used when the router bit 32 includes a diameter of three-eights of an inch. Other edges of the protrusions 58a-58d can be used when other diameter router bits 32 are used. This is dependent upon how wide each of the protrusions 58a-58d is made and the location of each of the protrusions 58a-58d relative to the center opening 40.

After having had benefit of the instant disclosure, it will become possible to provide different types of indications in the top plate 24, for example indication can be provided in the lip 44 thereof, to indicate where the stop dado 36b is to occur.

As is described in greater detail hereinafter, the dado guide 10, while able to accept any preferred diameter of the router bit 32, is optimally set to function with two different sizes of router bit 32. A preferred first size for the router bit 32 is three-eights of an inch in diameter. A preferred second size for the router bit 32 is one-half of an inch in diameter. Other diameter router bits, for example three-sixteenths of an inch in diameter, are possible for use as are other possible router bit 32 sizes. Any of the edges of any of the protrusions 58a-58d can be provided where desired in the top plate 24 and used to indicate where to stop motion of the router 28 to form the stop dado 36b when any preferred diameter of the router bit 32 is used.

Figure 3:
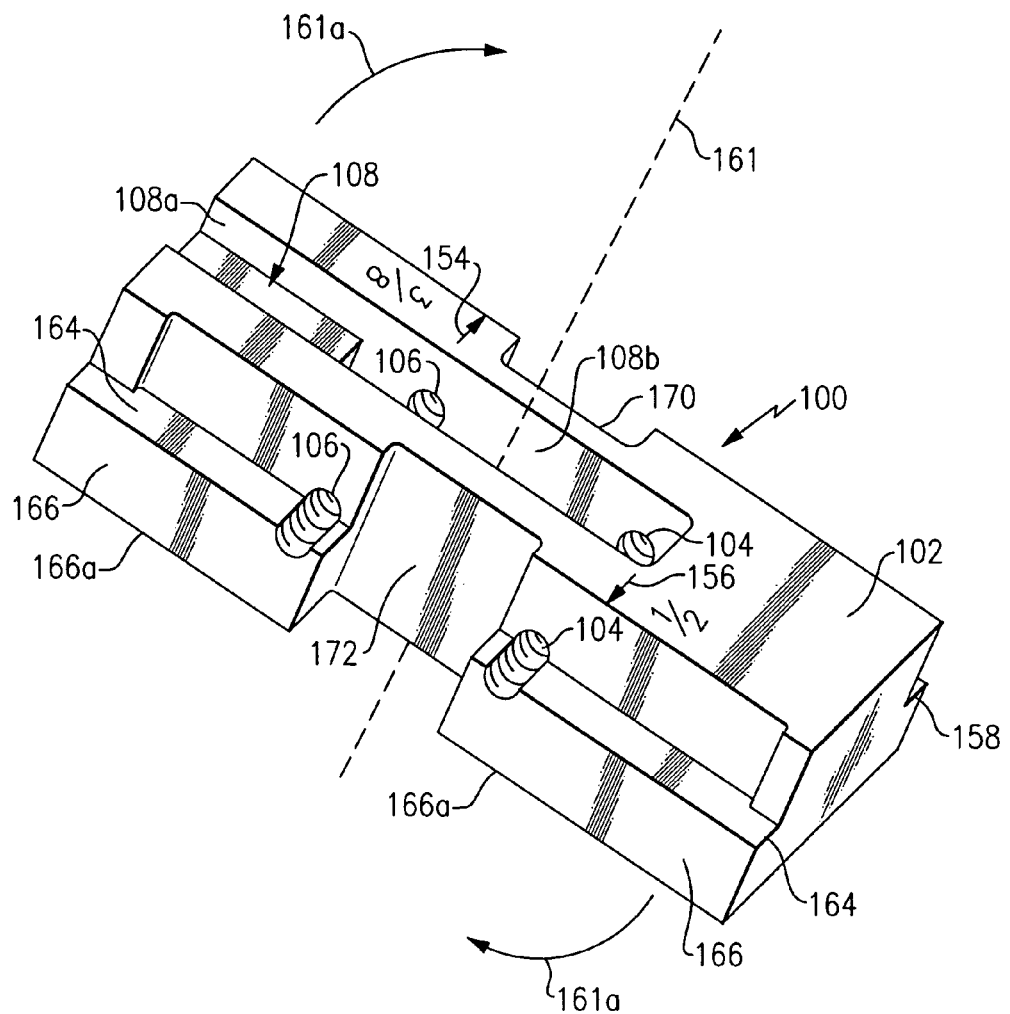
FIG. 3 is an enlarged view in perspective of a second assembly of the dado guide of FIG. 1 with a locking lever removed therefrom.
Figure 4:
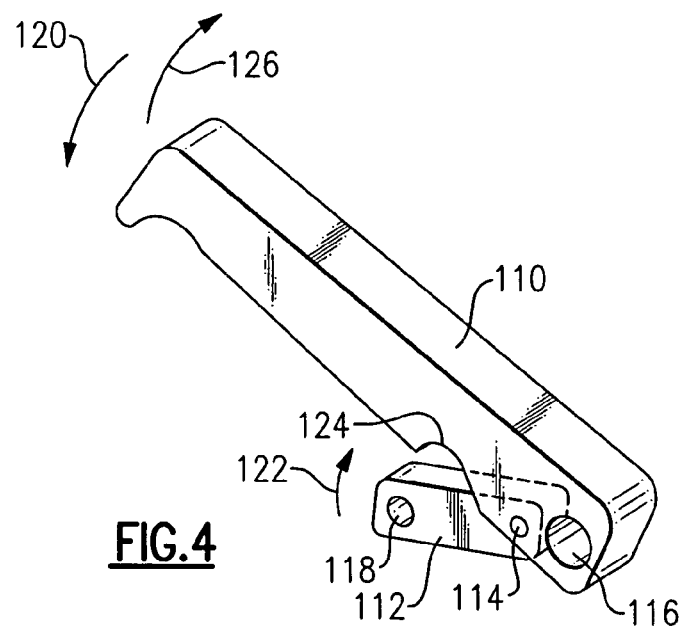
FIG. 4 is an enlarged view in perspective of a locking lever of the dado guide of FIG. 1.
Figure 5:
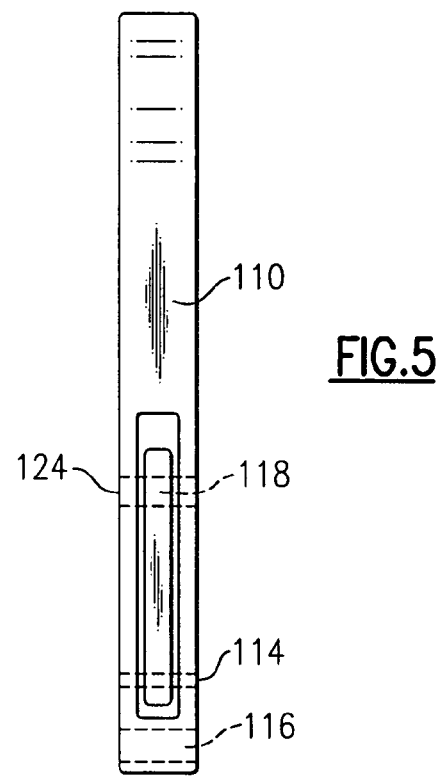
FIG. 5 is a bottom view of the locking lever of FIG. 4.

Referring now also to the remaining FIGS. 3-5, a second assembly, identified in general by the reference numeral 100, is provided.

The second assembly 100 includes a second base member 102. A pair of spaced-apart holes 104, 106 are also provided in the second base member 102 through which the pair of rods 14, 16 also pass through.

A first recess 108 is provided in the second base member 102. A locking lever 110 is disposed in the first recess 108. The first recess 108 is open at one end of the second base member 102 to allow a portion of the locking lever 110 to extend therefrom.

The first recess 108 includes a shallow depth at a first portion 108a thereof that is sufficient to accommodate the depth of the locking lever 110 that is disposed therein. An end of the locking lever 110 that extends beyond an end of the second base member 102 is readily available for the user to grasp and urge the locking lever 110 from a downward and locked position as shown in FIG. 1 into a raised and unlocked position, as shown in FIG. 4.

The first recess 108 includes a deeper depth at a second portion 108b thereof that is sufficient to accommodate the depth of a pivot lever 112 of the locking lever 110 and to allow access to the pair of rods 14, 16.

The pivot lever 112 is pivotally attached to the locking lever 110 about a pivot pin 114 that extends through the locking lever 110 and through a pair of pivot pin holes that are provided in the pivot lever 112. The locking lever 110 is placed in the first recess 108 and is disposed in the position as shown in FIG. 4, in the raised and unlocked position. This position facilitates assembly and is described in greater detail hereinafter.

At this time the second assembly 100, including the second base member 102 and the locking lever 110 are urged over the pair of rods 14, 16 and toward the first assembly 12. When the pivot lever 112 is disposed slightly away from the locking lever 110, as shown in FIG. 4, a distance between a first lever hole 116 that is provided in an end of the locking lever 110 and a second lever hole 118 that is provided in an end of the pivot lever 112 that is disposed away from the pivot pin 114 is equal to the normal, quiescent distance between the pair of rods 14, 16.

Accordingly, each of the pair or rods 14, 16 are able to easily pass through the pair of spaced-apart holes 104, 106 in the second base member 102, and also through the first and second lever holes 116, 118. The entire second assembly 100 is then easily able to slide along the longitudinal length of the pair of rods 14, 16 in either direction as shown by arrow 52.

When the locking lever is urged in a downward direction as shown by arrow 120 (FIG. 4), the second lever hole 118 rises with respect to the locking lever 110 as shown by arrow 122. A raised notch 124 is provided across a bottom of the locking lever 110 to accommodate the rod 14 as the locking lever 110 is lowered into the first recess 108.

As the second lever hole 118 rises closer toward a longitudinal center of the locking lever 110, the distance between the second lever hole 118 and the first lever hole 116 progressively increases. This produces a cam action that progressively urges the two rods 14, 16 further apart with respect to each other.

When the locking lever 110 is disposed fully down, as shown in FIG. 1, the pair of rods 14, 16 are maximally urged away from each other and are binding against opposite sides of the pair of spaced-apart holes 104, 106 in the second base member 102. This secures the second assembly 100 in position relative to the pair of rods 14, 16 and therefore relative to the first assembly 12.

When the locking lever 110 is disposed in the lowered locking position, the second lever hole 118 is preferably disposed slightly above the first lever hole 116. This produces a slight "over the center" type of latch mechanism that helps maintain the locking lever 110 in the downward and locked position during use.

It is important to secure the locking lever 110 in the locked position during use in order to prevent it from inadvertently loosening. If the locking lever 110 loosened during use, the width of the dado cut 36 would be affected, which is undesirable.

It is important to note that during use a base of the router 28 is also disposed over a portion of the second assembly 100 sufficient to help retain the locking lever 110 in the downward and locked position.

To loosen the second assembly 100 so that it can be urged where desired along the pair of rods 14, 16, an end of the locking lever 110 is grasped and is raised in the direction of arrow 126 until the locking lever 110 is in a slightly elevated position as shown in FIG. 4. This allows the pair of rods 14, 16 to return into their non-binding, quiescent, and normal spaced-apart relationship.

Prior to use, the dado guide 10 must be set so that the width of the dado cut 36 will be equal to or slightly more than the width of a shelf 150 (partially shown in FIG. 1). An edge of the shelf 150 will eventually be inserted into the dado cut 36. Therefore, the dado cut 36 must be wide enough to allow insertion of the edge of the shelf 150 therein. The dado cut 36 cannot be excessively wide, else a gap will appear when the shelf 150 is inserted into the dado cut 36. A gap would be indicative of poor quality workmanship.

Before the dado guide 10 can be set for the width of the shelf 150, the second assembly 100 must be properly oriented with respect to the first assembly 12 to match the diameter of the router bit 32 that is being used. This is done by observing a first router bit size arrow 152 on the first base member 18. On the second base member 102 there is a second router bit size arrow 154 that is used when the three-eights of an inch diameter size of the router bit 32 is used and the dado guide 10 so configured, and a third router bit size arrow 156 that is used when a one-half inch diameter size of the router bit 32 is used and the dado guide 10 so configured.

If the three-eights of an inch diameter router bit 32 is being used, then the second assembly 10 is oriented as shown in FIG. 1 with respect to the first assembly 12. In this orientation, a point of the second router bit size arrow 154 is facing (i.e., aiming at) a point of the first router bit size arrow 152.

This orientation of the first and second router bits size arrows 152, 154 with respect to each other provides a readily observable positive confirmation that the dado guide 10 is now configured for use with the three-eights of an inch diameter of the router bit 32.

A first base lip 158 protrudes from the second base member 102 and extends toward the first assembly 12 when the second assembly 100 is configured for use with the three-eights of an inch diameter of the router bit 32. The first base lip 158 is disposed below a top of the pair of rods 14, 16. This is important as far as setting the width of the dado cut 36 is concerned, and is described in greater detail hereinafter.

The first base lip 158 extends longitudinally along a bottom of the second base member 102 except for the span that is between the pair of rods 14, 16. A first plane 160 of the first base lip 158 is disposed on an outside edge of the first base lip 158 on both (i.e., opposite) sides of the pair of rods 14, 16. The first plane 160 is perpendicular with respect to the plane of the board 38.

A first mark 162 is made on the board 38 where an edge of the dado cut 36 is to occur. With the fence 46 loose and free to move over the surface of the board 38, the dado guide 10 is set to accommodate the width of the fence 46. The dado guide 10 is then placed on the board 38 and the dado guide 10 and fence 46 are urged over the surface of the board 38 until an inside bottom edge of the first plane 160 is disposed over the middle of the first mark 162 and the first plane 160 is parallel with respect to an edge of the board 38c.

This is accomplished in a variety of ways that a woodworker could readily accomplish, for example by measuring the distance that the fence 46 is disposed away from the edge of the board 38c. Once the fence 46 is properly disposed, it is clamped (secured) in position. This ensures that the dado cut 36 will occur where desired, parallel with the fence 46.

An inside bottom edge of the first plane 160 (of the second base member 102) aligns with an edge of the dado cut 36 when the three-eights of an inch diameter router bit 32 is used and the second assembly 100 is oriented as shown in FIG. 1.

Accordingly, the first plane 160 of the first base lip 158 is used to determine where the fence 46 should be clamped (secured). When the three-eights diameter router bit 32 is used and the dado guide 10 is configured with the point of the second router bit size arrow 154 facing the point of the first router bit size arrow 152, the edge of the dado cut 36 will align with the first mark 162.

This provides an easy way to position the dado guide 10 to ensure that the dado cut 36 will occur exactly where desired in the board 38.

It is only necessary to know where the one edge of the dado cut 36 will occur in order to provide the first mark 162 on the board 38. The dado guide 10, after calibration, determines where an opposite longitudinal edge 163 of the dado cut 36 will occur.

Also shown in FIG. 1 (dashed lines) is a possible alternate longitudinal edge 163a. The longitudinal edge 163 and the alternate longitudinal edge 163a are shown to indicate that the width of the dado cut 36 is a variable based entirely on the thickness of a shelf 150. This is discussed in greater detail hereinafter.

Of course, if several dado cuts 36 are required, then additional second, third, etc. marks (not shown) will also be placed on the board 38 at the desired locations of the edge of each of the additional dado cuts (not shown).

If a one-half inch diameter router bit 32 is used (instead of the three-eights inch diameter router bit 32), the second assembly 100 would be loosened and removed completely from the pair of rods 14, 16. It would then be rotated 180 degrees about a vertical axis 161 (dashed line in FIG. 3) as shown by arrows 161a and inserted back over the pair of rods 14, 16.

In this reversed position, a point of the third router bit size arrow 156 would be facing (i.e., aiming at) the point of the first router bit size arrow 152. This orientation of the first and third router bits size arrows 152, 156 with respect to each other provides a readily observable positive confirmation that the dado guide 10 is now configured for use with the one-half of an inch diameter router bit 32.

A second base lip 164 protrudes from the second base member 102 and extends toward the first assembly 12 when the second assembly 100 is disposed over the pair of rods 14, 16 and is configured for use with the one-half of an inch diameter router bit 32. The second base lip 164 is also disposed below a top of the pair of rods 14, 16. A second plane 166 of the second base lip 164 is disposed on an outside edge of the second base lip 164 on both sides of the pair of rods 14, 16. The second plane 166 is perpendicular with respect to the plane of the board 38.

With the fence 46 loose and free to move over the surface of the board 38 as described above, the dado guide 10 is then placed on the board 38 and the dado guide 10 and fence 46 are urged over the surface of the board 38 until an inside bottom edge 166a (FIG. 3) of the second plane 166 is disposed over the middle of the first mark 162 and the second plane 166 is parallel with respect to the edge of the board 38c. The second plane 160 aligns with the edge of the dado cut 36 when the one-half of an inch diameter router bit 32 is used and the second assembly 100 is oriented opposite that as shown in FIG. 1.

An easy method of determining an edge of the dado cut 36 is provided that is calibrated for use with either of two sizes of the router bit 32. The amount the first base lip 158 protrudes away from the second base member 102 is controlled during manufacture to align with the edge of the dado cut 36. Accordingly, the amount the first base lip 158 protrudes away from the second base member 102 is different than the amount the second base lip 164 protrudes away from the second base member 102.

A second recess 168 is provided in the first base member 18 between the pair of rods 14, 16. The second recess 168 includes a first edge 168a and an opposite second edge 168b that are parallel with an inside longitudinal edge of each of the rods 14, 16, respectively. The second recess 168 includes vertical walls that are perpendicular to the plane of the board 38. The vertical walls of the second recess 168 extend from the bottom of the first base member 18 to its top. The depth of the second recess 168 from a vertical plane of the first base member 18 that is disposed farthest away from the lip 44 is controlled to allow the guide bushing 30 to partially enter therein.

A third recess 170 is provided in the second base member 102 on a first side thereof (that includes the first base lip 158) between the pair of rods 14, 16. A fourth recess 172 is provided in the second base member on a side that is opposite the first side thereof (that includes the second base lip 164) also between the pair of rods 14, 16.

A depth of the third recess 170 is controlled to allow the guide bushing 30 to enter therein a certain amount when the dado cut 36 is being made. Because the three-eights of an inch diameter router bit 32 is disposed below and in the center of the guide bushing 30, the location of the router bit 32 circumference in relation to the second base member 102 is known. This information is then used to calculate the amount the first base lip 158 must extend out away from the second base member 102 in order to provide an indication of where an edge of the dado cut 36 will occur.

Similarly, a depth of the fourth recess 172 is controlled to allow the guide bushing 30 to enter therein a certain amount when the dado cut 36 is being made. Because the one-half of an inch diameter router bit 32 is disposed below and in the center of the guide bushing 30, the location of the router bit 32 circumference in relation to the second base member 102 is also known. This information is then used to calculate the amount the second base lip 164 must extend out away from the second base member 102 in order to provide an indication of where an edge of the dado cut 36 will occur.

To set the dado guide 10 to the desired width of the dado cut 36, the second assembly 100 is first properly oriented to correspond with the size of the router bit 32. It is understood that if other sizes of the router bit 32 are desired, then the dimensions of a modified second base member (not shown) are modified to provide the benefits and features described herein.

To continue to set the dado guide 10 for the width of the shelf 150 there is no need for a scrap piece of the shelf 150. Instead, the locking lever 110 is raised to loosen the second assembly 100. The second assembly 100 is then urged sufficiently far away from the first assembly 12 along the longitudinal length of the pair of rods 14, 16 to permit placing an edge of the shelf 150 therein.

As shown by arrow 174, FIG. 1, the edge of the shelf 150 is placed on top of the pair of rods 14, 16 in the space between the first base member 18 and the second base member 102. The second assembly 100 is then urged toward the first assembly 12 until the edge of the shelf 150 is snug between the first base member 18 and the second base member 102 while still resting atop the pair of rods 14, 16. At that time the locking lever 110 is urged downward into the locked position thereby securing the second assembly 100 to the pair of rods 14, 16 at the proper distance from the first assembly 100.

This procedure to set the width of the dado cut 36 is identical regardless of the orientation of the second assembly 100, whether it has first been set for use with either the three-eights or one-half inch diameter router bit 32.

It is important to note that the shelf 150 is not damaged, nor is any scrap piece required. An additional and unexpected benefit is also provided. If the shelf 150 is large or heavy, it is not even necessary to lift and then place the shelf 150 between the first and second assemblies 12, 100 to set the width of the dado cut 36. Instead, the dado guide 10 can easily be lifted and placed over any convenient edge of the shelf 150, thereby moving the dado guide 10 in a direction opposite that as shown by arrow 174.

While the dado guide 10 is held in position with an edge of the shelf 150 resting on the pair of rods 14, 16, the second assembly 100 is urged toward the first assembly 12 and, by using the locking lever 110, is secured in the desired position, as was generally described hereinbefore.

It is important to note that when setting the width of the dado cut 36, the edge of the shelf 150 is disposed on the pair of rods 14, 16. In this position neither the first base lip 158 nor the second base lip 164, which are each disposed below the pair of rods 14, 16, are able to make contact with the shelf 150. Accordingly, an upper portion of the second base member 102 that is disposed above the first base lip 158 and above the second base lip 164 are used to calibrate the width of the dado cut 36 whereas the first plane 160 and the second plane 166 are used to define where the edge of the dado cut 36 will occur.

After the dado guide 10 has been set, as described hereinbefore, to produce the dado cut 36 of the desired width the size of the center opening 40 will be properly set.

To make the dado cut 36, the router 28 is placed on top of the dado guide 10 so that a bottom base of the router 28 is disposed over a portion of the first and second assemblies 12, 100. The guide bushing 30 and the router bit 32 are disposed in the center opening 40. The guide bushing 30 cannot move in either direction of arrow 42 because it is contained by the pair of rods 14, 16. However, the guide bushing 30 is able to move in either direction of arrow 52 to the degree permitted by the size of the center opening 40.

If the dado cut 36 extends beyond an end of the board 38, the dado guide 10 is positioned slightly off of the board 38 so as to allow the router bit 32 to extend down beyond the top plane of the board 38. A portion of the dado guide 10 is disposed over the fence 46. The fence 46 is clamped in the desired position. The router 28 is turned on and is maximally urged toward the first assembly 12.

Accordingly, the guide bushing 30 will bear against the second recess 168. As the router 28 is urged in the direction of arrow 42a it is also maintained (i.e. held) against the second recess 168. The dado guide 10 moves in response to the force applied to the router 28 and is urged along the longitudinal axis of the fence 46 as long as sufficient force is applied to the router 28.

If the dado cut 36 were to extend beyond both (opposite) sides of the board 38 (not shown), the router 28 would be urged entirely across the board 38. If the stop dado 36b is used, then motion of the router 28 in the direction of arrow 42a would be stopped when the appropriate edge of one of the protrusions 58a-58d of the top plate opening 56 aligned with the stop dado cut mark 54.

Once motion of the router in the direction of arrow 42a is stopped, the router is urged in the direction of arrow 52 maximally away from the first assembly 12 until the guide bushing 30 bears against either the third recess 170 or against the fourth recess 172 of the second base member 102. At that time, the router 28 is urged in the direction of arrow 42b to complete the dado cut 36.

It is important to note that the same router bit 32 is used to complete the second pass of the stop dado cut 36b. It is not necessary to change the router bit 32 to another type of router bit (not shown) than can perform a plunge type of cut, and then switch back again to the router bit 32. This benefit would be realized even when the dado cut 36 includes two stop dados 36b.

Accordingly, the use of the dado guide 10 provides a substantial decrease in the amount of time required to make the dado cut 36 or the stop dado cut 36b.

It is also important to note that should the user forget to maintain pressure of the router 28 and therefore of the guide bushing 30 against the second recess 168 or against either the third recess 170 or against the fourth recess 172, no damage to the board 38 can possibly occur. The user would merely repeat the particular pass in which the "drifting" occurred to clean up that particular edge of the dado cut 36. This is a significant benefit to both skilled and unskilled woodworkers, alike.

If the dado cut 36 were wider than that which two passes of the router bit 32 could accomplish, the user would make successive passes in either the direction of arrow 42a or 42b to remove any remaining material inside of the dado cut 36.

It is important to note that should the router bit 32 encounter a knot in the board 38 that might suddenly urge it in either direction of arrow 52, no harm to the board 38 can possibly occur because the size of the center opening 40 will always retain the guide bushing 30, and therefore the router bit 32, within the desired width of the dado cut 36. This provides essentially "fail-safe" formation of the dado cut 36 in the board 38.

The dado guide 10 provides maximum ease of set up, maximum versatility, and maximum speed of making the dado cut 36, and prevents costly errors from occurring. These are substantial benefits over the prior art.

If desired, a friction-reducing material 176 is provided either inside the lip 44, inside the first rail 20, or both to facilitate sliding of the dado guide 10 with respect to the fence 46.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A dado guide adapted for providing a dado cut in a board, and wherein said dado guide is adapted for use with a woodworking fence, comprising:
   (a) a first assembly that is adapted to cooperate with the fence sufficient to permit said first assembly to slide in a first direction that is parallel with respect to a longitudinal length of the fence or to slide in a second direction that is opposite with respect to said first direction;
   (b) a pair of rods that are disposed in a parallel, spaced apart relationship with respect to each other and wherein each of said pair of rods includes a longitudinal axis that is perpendicular with respect to a longitudinal axis of the fence when an inside planar surface of a lip of said dado guide is disposed adjacent to a first side of the fence and a planar surface of a first rail is disposed adjacent to an opposite second side of the fence, and wherein each of said pair of rods is secured at a first end thereof to said first rail, and wherein said first assembly is coupled to the fence and is able to be urged in said first direction or in said second direction;
   (c) a second assembly that includes a pair of spaced-apart holes there-through and wherein said pair of rods are adapted to pass through said pair of spaced apart holes;
   (d) means for securing said second assembly away from said first assembly, wherein said second assembly is urged in said first direction or in said second direction in response to a movement by said first assembly an amount that is equal to said movement by said first assembly in said first direction or in said second direction, and
   (e) wherein a center opening is provided between each of said pair of rods and between said first assembly and said second assembly, and wherein a length of said center opening that is parallel to said longitudinal axis of said pair of rods is proportional to a width of the dado cut that said dado guide is adapted to cut in the board when the board is disposed under said center opening of said dado guide.

2. The dado guide of claim 1 wherein said center opening is adapted to receive a router guide bushing therein, and wherein a router is adapted to be secured to said router guide bushing, and wherein said router guide bushing is adapted to move as permitted by a length of said center opening in either direction that is parallel with respect to said longitudinal axis of said pair of rods in said center opening and wherein said router guide bushing is not adapted to move in either direction that is perpendicular with respect to said longitudinal axis of said pair of rods.

3. The dado guide of claim 1 wherein said means for securing said second assembly away from said first assembly includes means for securing said second assembly to said pair of rods.

4. The dado guide of claim 3 wherein said means for securing said second assembly to said pair of rods includes a locking lever and wherein said locking lever includes a raised position and wherein when said locking lever is disposed in said raised position, said second assembly is able to move along said longitudinal length of said pair of rods toward said first assembly or away from said first assembly, and wherein said locking lever includes a lowered position and wherein when said locking lever is disposed in said lowered position, said second assembly is not able to move along said longitudinal length of said pair of rods toward said first assembly or away from said first assembly.

5. The dado guide of claim 1 wherein said first assembly includes a first base member and a top plate, and wherein a proximal end of said top plate is attached to said first base member and wherein a remaining portion of said top plate extends in a direction that is away from said first base member of said first assembly and also away from said second assembly, and wherein said top plate includes a distal end and wherein said distal end of said top plate includes said lip, and wherein said lip is disposed at a ninety degree angle with respect to an upper surface of said top plate, and wherein said pair of rods pass through said first base member and including means attached to said first base member for securing said pair of rods thereto, and wherein a distance between an edge of said first rail that is disposed closest to said lip and an inside of said lip that is disposed closest to said first rail is a variable that is set to accommodate a width of the fence.

6. The dado guide of claim 1 wherein said second assembly is adapted for use with a router bit that includes a predetermined diameter, and wherein when said router bit that includes said predetermined diameter is used with said dado guide, an edge is provided along said second assembly that corresponds with a desired edge location of the dado cut that is to be made in the board.

7. The dado guide of claim 6 wherein said pair of rods are adapted to pass through said pair of holes in said second assembly until said second assembly is disposed in a first position and wherein said pair of rods are adapted to pass through said pair of holes in said second assembly until said second assembly is disposed in an opposite second position, and wherein when said second assembly is disposed in said first position, said second assembly is adapted for use with a first router bit that includes a first predetermined diameter, and wherein when said first router bit that includes said first predetermined diameter is used with said dado guide and when said second assembly is disposed in said first position, a first edge is provided along said second assembly that corresponds with said desired edge location of the dado cut that is to be made in the board.

8. The dado guide of claim 7 wherein when said second assembly is disposed in said second position, said second assembly is adapted for use with a second router bit that includes a second predetermined diameter that is different than said first predetermined diameter, and wherein when said second router bit that includes said second predetermined diameter is used with said dado guide and when said second assembly is disposed in said second position, a second edge is provided along said second assembly that corresponds with a desired second edge location of the dado cut that is to be made in the board.

9. The dado guide of claim 8 wherein said second assembly includes a second base member and wherein said first edge is provided along a longitudinal length of said second base member on a first side thereof, and wherein said second edge is provided along a longitudinal length of said second base member on a side thereof that is opposite to said first side thereof.

* * * * *